PULSE DURATION MODULATING ARRANGEMENTS INCLUDING MONOSTABLE MULTIVIBRATOR

Filed April 2, 1965 2 Sheets-Sheet 1

"PRIOR ART"

INVENTORS
RICHARD J. BELCASTRO
MAX S. MACRANDER
BY C. A. Gullbrandsen
ATTY.

United States Patent Office 3,402,368

Patented Sept. 17, 1968

3,402,368
PULSE DURATION MODULATING ARRANGEMENTS INCLUDING MONOSTABLE MULTIVIBRATOR

Richard J. Belcastro, Chicago, and Max S. Macrander, Wheaton, Ill., assignors to Automatic Electric Laboratories, Inc., Northlake, Ill., a corporation of Delaware Filed Apr. 2, 1965, Ser. No. 445,035
3 Claims. (Cl. 332—9)

ABSTRACT OF THE DISCLOSURE

Pulse duration modulator circuits have a basic form of a monostable multivibrator in which the discharge time constant or the initial charging potential for the timing capacitor is varied in response to the amplitude of an audio signal to provide variable time durations of the unstable state of the multivibrator. A varactor diode and nonlinear resistors are individually employed in separate embodiments in which the time constant is varied, and a superposition technique controls the initial charging potential of the timing capacitor in another embodiment.

This invention relates to arrangements for providing duration modulated pulses, particularly pulses of very short duration.

It is common practice to duration modulate sawtooth signals which possess a linear voltage-time relationship by modifying the peak value of the saw-tooth signals by means of an audio signal while keeping the slope constant. The result is a duration modulated signal train which can easily be converted into a duration modulated rectangular pulse train. These techniques become impractical when pulses of short duration are to be generated, such as in high speed time sharing networks.

In his United States patent application Delay Arrangement Using Transistor with Minority Carrier Storage, Ser. No. 365,766, filed May 7, 1964, issued Apr. 4, 1967, as Patent number 3,312,839 and assigned to the same assignee as the present invention, B. E. Briley teaches the use of arrangements which employ the collector following effect to overcome the above problem. However, these collector following arrangements provide high impedance circuitry and from our studies we find that low impedance circuitry is more desirable at a common point to keep crosstalk at a minimum in high speed time sharing systems. Modification of the collector following arrangements would be extensive, and thus expensive, to attain low impedance requirements.

The present invention overcomes the above problems by providing low impedance arrangements which are capable of providing extremely short pulse widths, for example in the order of 100 nanoseconds.

It is therefore the general object of this invention to provide new and improved pulse duration modulators.

A primary object of the invention is to provide new and improved pulse duration modulators having a low impedance and capable of producing very short pulse widths.

A feature of the invention resides in the utilization of a varactor diode to control the discharge time of its internal capacitance. The varactor diode has its capacitance, and hence its associated time constants, controlled by an audio signal introduced into the timing circuitry.

These and other objects and features of the invention will become apparent and the invention will be best understood from the following description taken in conjunction with the accompanying drawings in which.

Figures 2, 3A, 3B, 4:
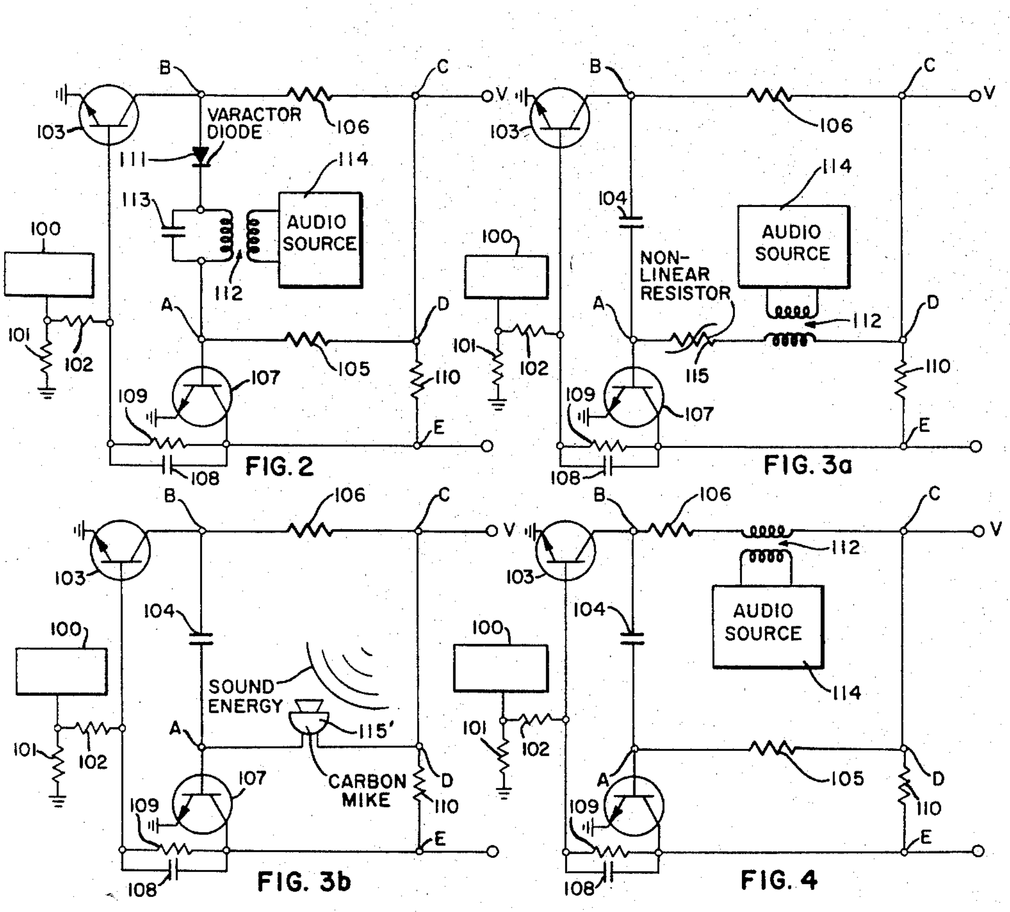
FIG. 2 is a schematic representation of an embodiment of the invention showing how the basic monostable circuit of FIG. 1 is modified according to the teachings of this invention to become a pulse duration modulator.
Figure 5:
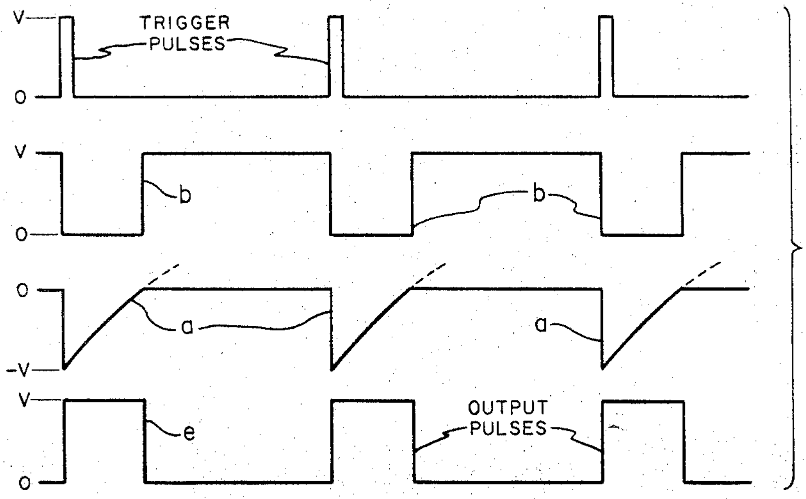
Figure 6:
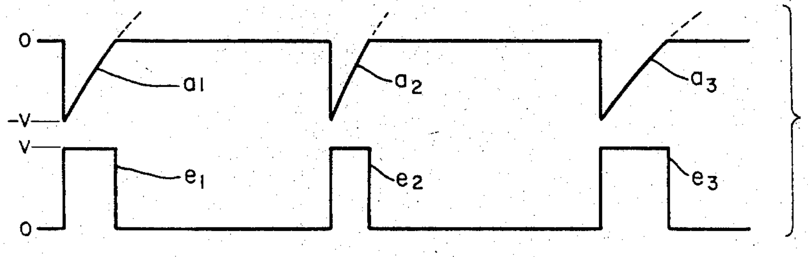
Figure 7:
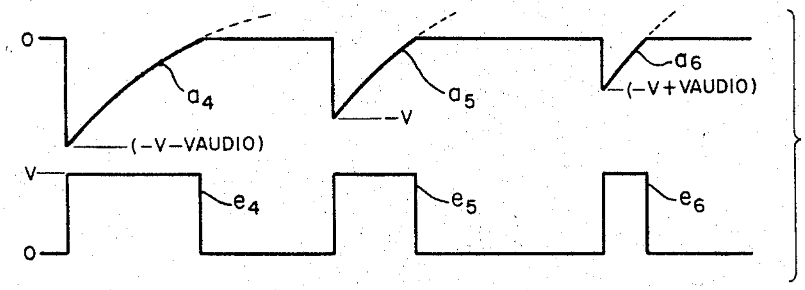

FIG. 3*a* is a schematic representation of another embodiment of the invention, FIG. 3*b* shows a modification thereof;

FIG. 4 is a schematic representation of still another embodiment of the invention; and FIGS. 5, 6 and 7 are graphical illustrations to aid in understanding the invention.

Briefly, the embodiments of the invention as described herein provide for controlling the unstable interval of a modification of a monostable multivibrator by controlling the discharge time constant of the circuit including its timing capacitor or by controlling the initial charging voltage of the timing capacitor. This control is effected in some instances by way of an audio signal acting on various nonlinear devices. While the description herein is drawn primarily to modulator arrangements, the invention may find other uses where it is desirable to provide variable time intervals or pulses of particular controlled widths.

Figure 1:
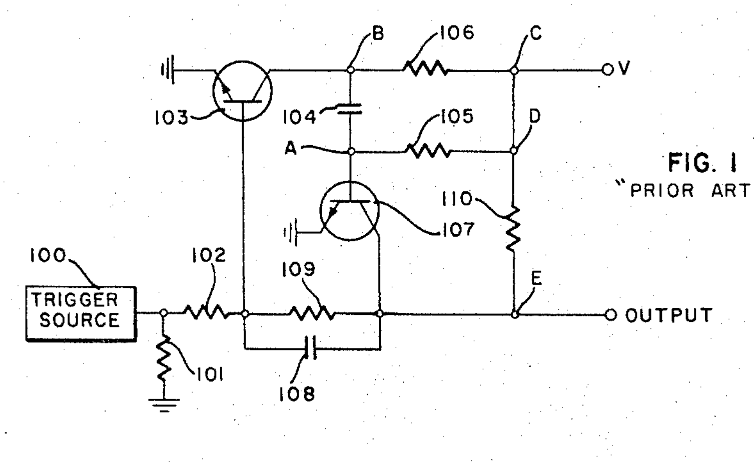
FIG. 1 is a schematic diagram of a known monostable multivibrator.

FIG. 1 describes a monostable multivibrator which comprises transistors 103 and 107, biasing resistances 105, 106, 109, 110, a resistance 101 to match the impedance of trigger pulse source 100, and a timing capacitance 104. Capacitance 108 is employed in the well known speed-up coupling technique.

The circuits of FIGS. 1–4 are powered from a direct current source represented by reference character V.

FIG. 2 describes a pulse duration modulator resulting from a modification of FIG. 1. Junctions A, B, C, D, E and OUTPUT and circuit elements 104, 105, 106, 107 and 110 have been retained, where applicable throughout all the figures for easy reference and continuity with the monostable circuit of FIG. 1. In FIG. 2, varactor diode 111 replaces capacitance 104. Audio source 114 controls the capacitance of the varactor diode via transformer 112. Capacitance 113 provides an A.C. short to the reflected impedance of the primary circuit, to insure that the varactor diode is the only effective component in the circuit A–B.

FIG. 3*a* describes another modulator circuit wherein nonlinear resistance 115 replaces resistance 105 of FIG. 1 in the circuit A–D. Audio source 114 via transformer 112 controls the nonlinear resistance as will be spelled out below.

FIG. 3*b* is similar to FIG. 3*a* except that a microphone 115 having a nonlinear resistance characteristic replaces the resistance 115, source 114 and transformer 112.

In FIG. 4, source 114 provides a variable initial charge condition on capacitance 104 as will be explained below.

FIGS. 5, 6, and 7 will be considered in conjunction with FIGS. 1 to 4 in the discussion below. Lower case references (i.e., $a$, $a_1$, $e_5$, etc.) refer to corresponding capital junction references (i.e., A and E) in these figures.

Referring to FIG. 1, in the stable condition transistor 107 is "on," providing ground to hold transistor 103 "off." The output at E is at ground potential and capacitance 104 is charged. A positive trigger pulse from source 100 to the base of transistor 103 turns transistor 103 "on." The potential drop at the collector of transistor 103 (FIG. 5, pulses *b*) is effective via capacitance 104 to turn off transistor 107 as the potential (FIG. 5, pulses *a*) at the base of transistor 107 reaches the potential and point E goes to V volts (FIG. 5, pulse *e*). Capacitance 104 is allowed to discharge at a rate (curved portions of pulses *a*) determined primarily by its capacitance and the value of resistance 105. When capacitance 104 has discharged sufficiently so that junction A reaches the threshold value for transistor 107, transistor 107 again turns on providing a ground via speed-up capacitance 109 to turn off transistor 103. This operation is well known and it is felt that nothing more need be said for the operation of a monostable multivibrator.

Referring to FIG. 2, it can be seen that a varactor diode 111 has taken the place of timing capacitance 104. The varactor diode has a variable capacitance governed by the potential thereacross, to wit:

$$C=C_1+KV \qquad (1)$$

where $C_1$ is a constant capacitance, K is a proportionality constant and V is the terminal voltage across the terminals of the varactor diode.

The insertion of an audio signal via transformer 112 controls the V of expression (1) whereby the total capacitance is variable. Assuming an audio input of $V \sin wt$ for example, the output pulse duration would vary about some average value. In practice, however, variable audio signals would be employed providing a variety of pulse durations. FIG. 6 shows that for various time constants, different output pulse widths are obtained.

Referring to FIG. 3*a*, a non-linear resistance having a dynamic resistance governed by the expression $$R=1/nK=V^{1-n} \qquad (2)$$

where K is a constant and $n$ is a constant greater than 1 and V is the voltage across the resistance. With the capacitance of element 104 a constant, the variation of resistance effected by source 114 via transformer 112 provides various pulse widths at terminal E during the correspondingly timed unstable intervals.

The pulse duration modulator according to FIG. 3*b* also operates similar to that of FIG. 3*a*. In FIG. 3*b*, however, a transducer, such as a carbon microphone 115′ connected between junctions A and D, directly couples the acoustical modulating energy to control its nonlinear resistance. Since FIG. 6 is based on changes in time constant, it is also descriptive of the operation of FIGS. 3*a* and 3*b*. Since the varactor diode acts as a capacitor the pulses $a_1$, $a_2$ and $a_3$ have the same general form as pulses *a* of FIG. 5; however, the varactor diode is also acting as a variable capacitor and the discharge time thereof, which is modified by the audio signal, varies accordingly. Therefore, the output pulses $e_1$, $e_2$ and $e_3$ show varied durations which correspond to the time duration of discharge, viz., the width of pulses $a_1$, $a_2$ and $a_3$.

FIG. 4 describes an arrangement for providing pulse duration modulation which does not involve varying the time constant of the discharging circuit. Instead, audio signals from source 114 are introduced into the charging path of capacitance 104 via transformer 112. Capacitance 104 will therefore initially charge to varying values as governed by the audio input as is shown in FIG. 7. In FIG. 7 the output pulses $e_4$, $e_5$ and $e_6$ are of different durations and this is again due to the discharge time of the timing capacitor. However, it is shown in FIG. 7 that pulses $a_4$, $a_5$ and $a_6$ have similar forms of discharge rate and different potentials from which discharge begins. Pulse $a_5$ illustrates a condition of zero audio input, while pulses $a_4$ and $a_6$ show negative and positive superposition of audio signals onto the supply voltage. The discharge time therefore varies accordingly while the time constant remains the same. In this embodiment the discharge time variation, in the first approximation, is linearly related to the amplitude of the audio voltage.

A particular experimental arrangement according to FIG. 2 employed the following components and circuit values.

| | | |
|---|---|---|
| Transistors **103, 107** | | 2N709 |
| Varactor diode **111** | | 1N952 |
| Resistances: | | |
| **102** | ohms | 170 |
| **105** | do | 2700 |
| **106** | do | 5000 |
| **109** | do | 1500 |
| **110** | do | 390 |
| Direct current source V | volts | +6 |
| Trigger source **100**: | | |
| Magnitude | volts | 5–6 |
| Frequency | kc | 10 |

A variable output signal generator provided the audio signals via a step-down transformer.

While the invention has been described by reference to specific embodiments, many changes and modifications may be made by those skilled in the art without departing from the spirit and scope of the invention and should be included in the appended claims.

What is claimed is:

1. In a monostable multivibrator including a normally conductive first transistor having an emitter, a base and a collector, a normally non-conductive second transistor having an emitter, a base and a collector, an output terminal connected to the collector of said first transistor, a first input terminal connected to the base of said second transistor for receiving trigger pulses which cause said second transistor to become conductive and said first transistor to become non-conductive, a source of D.C. voltage, and a timing circuit connected to said source and to the collector of said second transistor and to the base of said first transistor, said timing circuit being operable upon conduction of said second transistor to hold said first transistor non-conductive for a time interval, the improvement comprising: a transformer including a primary winding for receiving modulating signals and a secondary winding, and a varactor diode connected in series with said secondary winding in said timing circuit between the collector of said second transistor and the base of said first transistor, the capacitance of said varactor diode being varied in accordance with the amplitude of said modulating signals to control the time interval that said first transistor is held non-conductive.

2. In a monostable multivibrator including a normally conductive first transistor having an emitter, a base and a collector, a normally non-conductive second transistor having an emitter, a base and a collector, an output terminal connected to the collector of said first transistor, a first input terminal connected to the base of said second transistor for receiving trigger pulses which cause said second transistor to become conductive and said first transistor to become non-conductive, a source of D.C. voltage, and a timing circuit connected to said source and to the collector of said second transistor and to the base of said first transistor, said timing circuit being operable upon conduction of said second transistor to hold said first transistor non-conductive for a time interval, the improvement comprising: a transformer including a primary winding for receiving modulating signals and a secondary winding, and a voltage controllable non-linear resistor connected in series with said secondary winding between the base of said first transistor and said source, the resistance of said non-linear resistor being varied in accordance with the amplitude of said modulating signals to control the time interval that said first transistor is held non-conductive.

3. In a monostable multivibrator including a normally conductive first transistor having an emitter, a base and a collector, a normally non-conductive second transistor having an emitter, a base and a collector, an output terminal connected to the collector of said first transistor, a first input terminal connected to the base of said second transistor for receiving trigger pulses which cause said second transistor to become conductive and said first transistor to become non-conductive, a source of D.C. voltage, and a timing circuit connected to said source and to the collector of said second transistor and to the base of said first transistor, said timing circuit being operable upon conduction of said second transistor to hold said first transistor non-conductive for a time interval, the improvement comprising: a capacitor, and a transformer having a primary winding for receiving modulating signals and a secondary winding, said secondary winding being serially connected to said capacitor between said source and the collector of said second transistor, whereby said capacitor is initially charged when said first transistor is conductive and voltages induced to said secondary winding upon receipt of said modulating signals are superimposed on the voltage of said source to vary the initial charging potential and the discharge time for said capacitor and thereby control the time interval that said first transistor is held non-conductive.

References Cited

UNITED STATES PATENTS

| | | | |
|---|---|---|---|
| 2,934,659 | 4/1960 | Abbott | 307—88.5 |
| 3,080,535 | 3/1963 | Ross | 332—16 TX |
| 3,170,124 | 2/1965 | Candilis | 307—88.5 |
| 3,237,188 | 2/1966 | Shair et al. | 307—88.5 |
| 3,289,170 | 11/1966 | Currey et al. | 307—88.5 |

ALFRED L. BRODY, *Primary Examiner.*